United States Patent
Yoshimura et al.

(10) Patent No.: US 7,502,316 B2
(45) Date of Patent: Mar. 10, 2009

(54) DATA RECEIVING APPARATUS AND DATA RECEIVING METHOD

(75) Inventors: Takeshi Yoshimura, Yokohama (JP); Tomoyuki Ohya, Yokohama (JP); Hidetoshi Ueno, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 573 days.

(21) Appl. No.: 11/034,801

(22) Filed: Jan. 14, 2005

(65) Prior Publication Data

US 2005/0185585 A1    Aug. 25, 2005

(30) Foreign Application Priority Data

Jan. 16, 2004    (JP)    ............................ P2004-009677

(51) Int. Cl.
  *H04J 1/16*    (2006.01)
  *G08C 25/02*    (2006.01)

(52) U.S. Cl. ........................ 370/229; 714/748

(58) Field of Classification Search ............ None
See application file for complete search history.

(56) References Cited

U.S. PATENT DOCUMENTS

| | | | |
|---|---|---|---|
| 6,381,709 B1 * | 4/2002 | Casagrande et al. ........... 714/18 |
| 6,526,435 B1 * | 2/2003 | Lippert ........................ 709/203 |
| 2002/0038441 A1 | 3/2002 | Eguchi et al. |
| 2002/0095636 A1 * | 7/2002 | Tatsumi et al. ............... 714/748 |
| 2005/0160184 A1 * | 7/2005 | Walsh et al. ................. 709/247 |
| 2006/0212539 A1 * | 9/2006 | Palevich et al. .............. 709/217 |

FOREIGN PATENT DOCUMENTS

| | | |
|---|---|---|
| CN | 1394411 A | 1/2003 |
| EP | 0 876 023 A1 | 11/1998 |
| EP | 1 235 383 A1 | 8/2002 |
| EP | 1 398 705 A1 | 3/2004 |
| JP | 2002-124992 | 4/2002 |
| JP | 2002-359641 | 12/2002 |
| WO | WO 02/37763 A1 | 5/2002 |
| WO | 02/097634 A1 | 12/2002 |

OTHER PUBLICATIONS

IETF RFC3926, Flute-File Delivery over Unidirectional Transport, Oct. 2004, pp. 1-27.

Shingo Kinoshita, et al., "A Survey of Reliable Multicast Technology", Transections B, of The Institute of Electronics, Information and Communication Engineers, vol. J85-B, No. 11, Nov. 2002, pp. 1819-1842, (with English translation).

* cited by examiner

*Primary Examiner*—Firmin Backer
*Assistant Examiner*—Clemence Han
(74) *Attorney, Agent, or Firm*—Oblon, Spivak, McClelland, Maier & Neustadt, P.C.

(57) ABSTRACT

A data receiving apparatus has a unidirectional channel receiver for receiving segmental data forming an electronic file, through a unidirectional channel; a file assembler for restoring the electronic file, based on the segmental data received by the unidirectional channel receiver; a channel information memory for acquiring location information for specifying a location of the electronic file; and a bidirectional channel transmitter/receiver for establishing a bidirectional channel when there arises a need for retransmission of the electronic file, for sending a request for transmission of the electronic file to a data transmitting device specified by the location information, through the bidirectional channel, and for receiving the electronic file through the bidirectional channel.

12 Claims, 15 Drawing Sheets

Fig. 3

```
<?xml version="1.0" encoding="UTF-8"?>
<FDT-Payload xmlns:xsi="http://www.w3.org/2001/XMLSchema-instance"
    xmlns:fl="http://www.example.com/flute"
    xsi:schemaLocation="http://www.example.com/flute fdt-6a.xsd"
    Expires="2890842807">
    <File   Content-Location="www.example.com/menu/tracklist.html"
            TOI="1"
            Content-Type="text/html"
            PtP-Repair="http://repair-server/menu/tracklist.html"      ← P3
            PtP-Repair-Wait-Time="30s" />                               ← P4
</FDT-Payload>
```

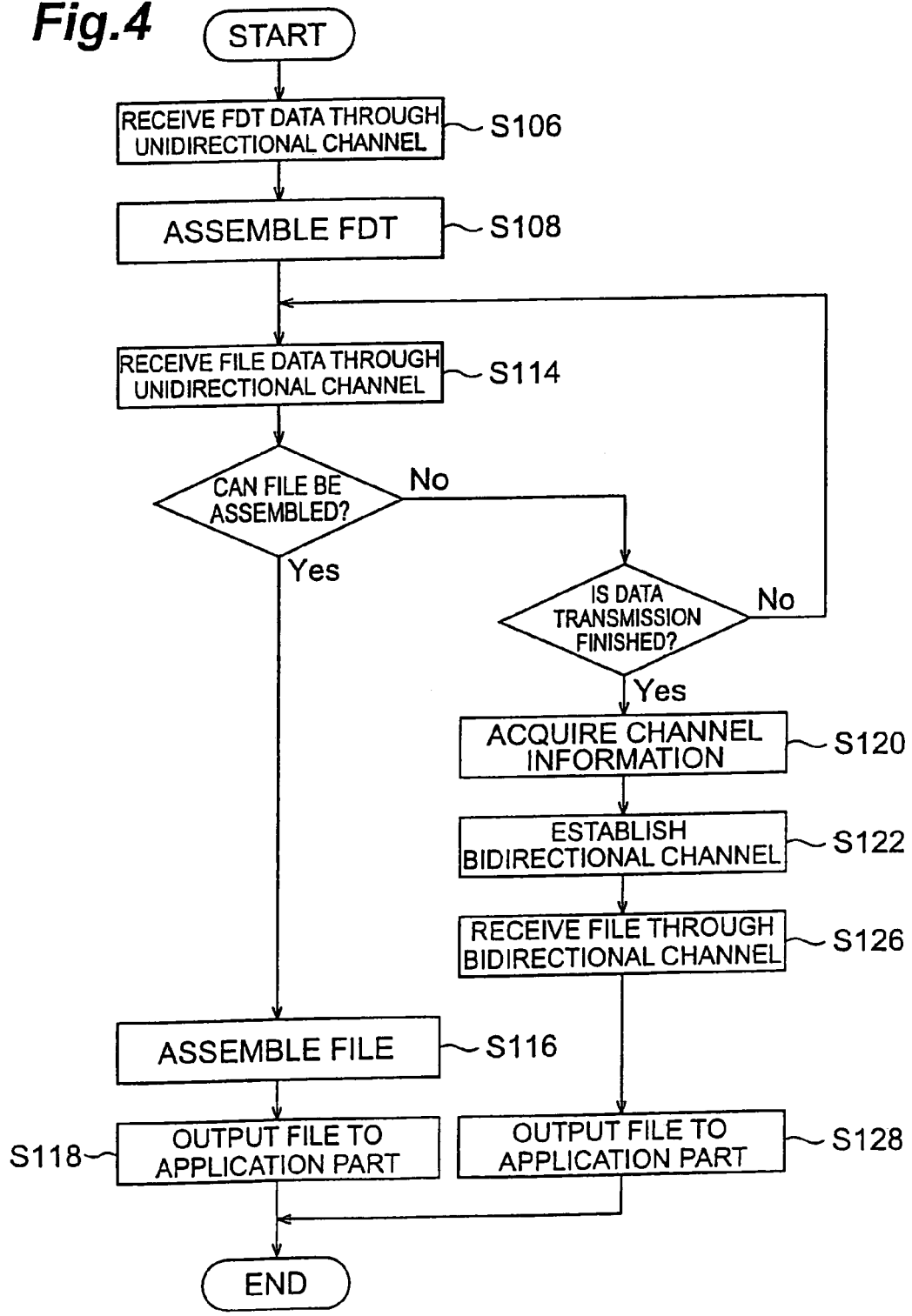

```xml
<?xml version="1.0" encoding="UTF-8"?>
<FDT-Payload xmlns:xsi="http://www.w3.org/2001/XMLSchema-instance"
    xmlns:fl="http://www.example.com/flute"
    xsi:schemaLocation="http://www.example.com/flute fdt-6a.xsd"
    Expires="2890842807">
    <File   Content-Location="www.example.com/menu/tracklist.html"
            TOI="1"
            Content-Type="text/html"
            PtP-Repair="+81 46 840 XXXX"         ─ P5
            PtP-Repair-Wait-Time="1min"          ─ P6
            PtP-Repair-Bitrate="8000"            ─ P7
            PtP-Repair-Method="PPP"              ─ P8
            PtP-Repair-Expires="2890842807" />   ─ P9
</FDT-Payload>
```

```
GET http://repair-server/menu/tracklist.html HTTP/1.0
User-Agent: MBMS-client6.0
Host: repair-server
Range: bytes=101-200                                    }--P10
```

Fig.15

```
<?xml version="1.0" encoding="UTF-8"?>
<FDT-Payload xmlns:xsi="http://www.w3.org/2001/XMLSchema-instance"
    xmlns:fl="http://www.example.com/flute"
    xsi:schemaLocation="http://www.example.com/flute fdt-6a.xsd"
    Expires="2890842807">
    <File    Content-Location="www.example.com/menu/tracklist.html"     ─┐ P1
             TOI="1"                                                      │
             Content-Type="text/html"/>                                  ─┘
    <File    Content-Location="www.example.com/tracks/track1.mp3"        ─┐ P2
             TOI="2"                                                      │
             Content-Length="6100"                                        │
             Content-Type="audio/mp3"                                     │
             Content-Encoding="gzip"                                      │
             Content-MD5="Eth76GIkJU45sghK"                               │
             Some-Private-Extension-Tag="abc123"/>                       ─┘
</FDT-Payload>
```

BACKGROUND ART

US 7,502,316 B2

DATA RECEIVING APPARATUS AND DATA RECEIVING METHOD

BACKGROUND OF THE INVENTION

1. Field of the Invention

The present invention relates to a data receiving apparatus and a data receiving method.

2. Related Background Art

3GPP (3rd Generation Partnership Project) is working on MBMS (Multimedia Broadcast/Multicast Service) to implement the broadcast/multicast service in third-generation mobile communication systems. The MBMS provides only a downlink channel from a base station to a mobile station but provides no uplink channel from a mobile station to a base station. In digital broadcast, similarly, the service also provides only a downlink channel from a broadcast station to a receiver but provides no uplink channel from a receiver to a broadcast station.

An example of the known technologies of delivering electronic files through the use of such a unidirectional channel is FLUTE (File Delivery over Unidirectional Transport), for example, as disclosed in Non-patent Document 1 below. FIG. 14 is an illustration showing a file delivery sequence in FLUTE. In FLUTE, a data transmitter 1 first delivers a File Delivery Table (hereinafter referred to as FDT) containing attributes of electronic files to be delivered, as object ID(TOI) =0 (S10). A data receiver 2 receives the FDT delivered from the data transmitter 1, through the unidirectional channel. FIG. 15 is an illustration showing a description example of the FDT in FLUTE. The FDT contains the description in the XML format of attribute information, such as a file name, an object ID, a file type, a compression type, a data length, and a URL, about one electronic file or about each of two or more electronic files, as shown in FIG. 15. It is seen herein that the FDT shown in FIG. 15 contains the description of the attribute information of an electronic file with object ID=1 (dashed, enclosed part P1) and the attribute information of an electronic file with object ID=2 (dashed, enclosed part P2).

After delivering the FDT, the data transmitter 1 divides each electronic file into segments and delivers the segments. In the example shown in FIG. 14, the data transmitter 1 first divides the electronic file 1 with object ID=1 into a plurality of packets and delivers them (S12), and, subsequently, the data transmitter 1 divides the electronic file 2 with object ID=2 into a plurality of packets and delivers them (S14). The data receiver 2 receives the electronic files delivered from the data transmitter 1, through the unidirectional channel. Thereafter, the data receiver 2 assembles each received electronic file and transfers the assembled electronic file to an appropriate application with reference to the File Delivery Table received in advance.

FLUTE allows delivery of relatively high volume of electronic files through the unidirectional channel in accordance with the procedure as described above. In FLUTE, redundant data for restoration of the segmental data is also delivered, in addition to the segmental data forming each electronic file, so as to enable restoration of the segmental data from the redundant data even with loss of part of the segmental data, thereby ensuring a certain level of reliability.

There are also disclosed techniques of performing data delivery with high reliability also using an uplink channel. Non-patent Document 2 below describes that, during an operation of delivering an electronic file from a data transmitter to a data receiver, an uplink channel is always established for transmission of a signal from the data receiver to the data transmitter, to enable the data receiver to send a packet loss signal (NACK) through the uplink channel. Patent Document 1 below discloses such technology that after a data transmitter delivers data by multicast to a data receiver, the data receiver notifies the source data transmitter of a data part not acquired successfully, and the data transmitter again transmits the data part thus notified of, by multicast.

[Patent Document 1] Japanese Patent Application Laid-Open No. 2002-124992

[Non-patent Document 1] "FLUTE-File Delivery over Unidirectional Transport," IETF Internet Draft, draft-ietf-rmt-flute-07.txt, December 2003

[Non-patent Document 2] Shingo Kinoshita, "Current trend of reliable multicast technology," Transactions B of THE INSTITUTE OF ELECTRONICS, INFORMATION AND COMMUNICATION ENGINEERS Japan, Vol. J85-B, No. 11, pp. 1819-1842, November 2002

SUMMARY OF THE INVENTION

However, the conventional technologies described above had the following problems. Specifically, the technology described in above Non-patent Document 1 uses only the unidirectional channel in transmission of electronic files from the data transmitter to the data receiver. Therefore, it neither allows the data receiver to notify the data transmitter of a loss of data nor does the data transmitter to again deliver lost data to the data receiver; therefore, it fails to ensure data delivery with high reliability.

The technology described in above Non-patent Document 2 requires that the uplink channel for transmission of a signal from the data receiver to the data transmitter should be always established in order to enhance the reliability of data delivery. Therefore, it fails to achieve effective utilization of network resources. Since the downlink channel and the uplink channel need to be simultaneously established, this technology cannot be applied to data receivers incapable of simultaneously establishing the downlink channel and the uplink channel, for example, in cases where the downlink channel is a multicast channel.

Furthermore, the technology described in above Patent Document 1 is to notify the source data transmitter of a data part failed in acquisition by the data receiver and to again transmit the data part notified of, by multicast from the data transmitter. Therefore, the data transmitter needs to have both of a data delivery function (multicast data delivery) and a data retransmission function (function of retransmitting a specific data part according to a data transmission request from a data receiver), so that the configuration of the data transmitter becomes complicated.

The present invention has been accomplished in order to solve the above problems and an object of the present invention is to provide a data receiving apparatus and a data receiving method enabling data delivery with high reliability, without any complication of the configuration of data transmitting apparatus, even in cases where the data receiving apparatus is incapable of simultaneously establishing a downlink channel and an uplink channel.

In order to achieve the above objects, a data receiving apparatus of the present invention comprises first receiving means for receiving through a unidirectional channel, segmental data forming an electronic file, or redundant data for restoration of the segmental data; restoring means for restoring the electronic file, based on the segmental data or the redundant data received by the first receiving means; location information acquiring means for acquiring location information for specifying a location of the electronic file; channel establishing means for establishing a bidirectional channel when there arises a need for retransmission of all or part of the electronic file; and second receiving means for sending a request for transmission of all or part of the electronic file to the location specified by the location information acquired by the location information acquiring means, through the bidirectional channel established by the channel establishing means, and for receiving all or part of the electronic file from the location through the bidirectional channel.

In order to achieve the above objects, a data receiving method of the present invention is a data receiving method for a data receiving apparatus to receive an electronic file, the data receiving method comprising: a first receiving step of receiving through a unidirectional channel, segmental data forming the electronic file, or redundant data for restoration of the segmental data; a restoring step of restoring the electronic file, based on the segmental data or the redundant data received in the first receiving step; a location information acquiring step of acquiring location information for specifying a location of the electronic file; a channel establishing step of establishing a bidirectional channel when there arises a need for retransmission of all or part of the electronic file; and a second receiving step of sending a request for transmission of all or part of the electronic file to the location specified by the location information acquired in the location information acquiring step, through the bidirectional channel established in the channel establishing step, and receiving all or part of the electronic file from the location through the bidirectional channel.

According to the present invention, the data receiving apparatus normally receives data through the unidirectional channel, and when there arises a need for retransmission of data, the data receiving apparatus separately establishes the bidirectional channel to request retransmission of data. Therefore, it is feasible to perform data delivery with high reliability, even in cases where the data receiving apparatus is incapable of simultaneously establishing a downlink channel and an uplink channel. Namely, the data receiving apparatus does not have to simultaneously establish the downward unidirectional channel and the bidirectional channel. In the present invention, the data receiving apparatus acquires the location information of the electronic file and, when there arises a need for retransmission of the electronic file, the data receiving apparatus sends a request for transmission of the electronic file to the location specified by the location information. Therefore, the destination of the request for retransmission of the electronic file can be any device different from a data transmitting device which is a source transmitter to deliver the data. Accordingly, the data transmitting device needs to have only the data delivery function (multicast data delivery), and the data retransmission function (the function of retransmitting a specific data portion according to a data transmission request from the data receiving apparatus) can be distributed to another device. As a result, the data transmitting device can be constructed in a simple configuration.

In a preferred form, the data receiving apparatus of the present invention further comprises determining means for determining an end of transmission of the segmental data forming the electronic file, or the redundant data for restoration of the segmental data, and the channel establishing means establishes the bidirectional channel when the determining means determines the end of transmission and when the restoring means fails to restore the electronic file.

In this preferred form, the bidirectional channel is established only upon a failure in restoration of the electronic file in spite of a determination of an end of transmission, which can decrease the frequency of establishment of the bidirectional channel. As a result, it is feasible to effectively utilize the network resources and radio resources.

In another preferred form, the data receiving apparatus of the present invention further comprises wait time information acquiring means for acquiring wait time information for specifying a wait time before establishment of the bidirectional channel, and the channel establishing means establishes the bidirectional channel after a wait for a time calculated using the wait time specified by the wait time information acquired by the wait time information acquiring means, and a random number when the determining means determines the end of transmission and when the restoring means fails to restore the electronic file.

In this preferred form, each of data receiving devices is configured to, upon a failure in restoration of an electronic file in spite of a determination of an end of transmission, establish the bidirectional channel after a wait for a time calculated using the fixed wait time and a random number, whereby, where the plurality of data receiving devices simultaneously fail to acquire an electronic file delivered through the same unidirectional channel, it is feasible to avoid these data receiving devices' concurrently establishing the bidirectional channel. As a result, it becomes feasible to prevent congestion of networks or radio channels and to implement stable delivery of electronic files.

In another preferred form, the data receiving apparatus of the present invention further comprises channel information acquiring means for acquiring channel information about the bidirectional channel, and the channel establishing means establishes the bidirectional channel, based on the channel information acquired by the channel information acquiring means.

In this preferred form, the channel information about the bidirectional channel is acquired and the bidirectional channel is established based on the channel information; whereby the electronic file can be readily and securely received from the location of the electronic data (a data retransmitting device for retransmitting a specific data portion according to a data transmission request from the data receiving apparatus). Namely, the data receiving apparatus can readily and securely establish the bidirectional channel, utilizing such information as a channel type, a data transfer rate, a file transfer method, and a valid duration included in the channel information, and receive the electronic file through the bidirectional channel. In addition, an administrator of a network, a data transmitting device, or a data retransmitting device can designate a channel type or a data transfer rate included in the channel information, to avoid congestion of the network or instability of the system.

In another preferred form, the data receiving apparatus of the present invention further comprises channel information storing means for preliminarily storing channel information about the bidirectional channel, and the channel establishing means establishes the bidirectional channel, based on the channel information stored in the channel information storing means.

In this preferred form, the bidirectional channel is established based on the channel information about the bidirectional channel, whereby the electronic file can be readily and securely received from the location of the electronic data (i.e., from a data retransmitting device for retransmitting a specific data portion according to a data transmission request from the data receiving apparatus). In this case, where the channel information is preliminarily stored in the channel information storing means of the data receiving apparatus, there is no need for acquiring the channel information on a case-by-case basis from the outside (e.g., there is no need for case-by-case transfer of the channel information from a data transmitting device), which can reduce the volume of information transmitted from the data transmitting device to the data receiving apparatus. As a result, it is feasible to effectively utilize the network resources and radio resources. This form is effective, particularly, in continuous delivery of electronic files.

In another preferred form, the data receiving apparatus of the present invention is so configured that when sending the request for transmission of all or part of the electronic file, the second receiving means selectively requests an unacquired portion.

In another preferred form, the data receiving method of the present invention is so configured that the second receiving step comprises selectively requesting an unacquired portion on the occasion of sending the request for transmission of all or part of the electronic file.

In these preferred forms, an unacquired portion of data is selectively requested, whereby the data part already acquired through the unidirectional channel does not have to be retransmitted through the bidirectional channel. Therefore, it is feasible to reduce the volume of information transmitted from the data retransmitting device to the data receiving apparatus. As a result, it becomes feasible to effectively utilize the network resources and radio resources.

In another preferred form, the data receiving apparatus of the present invention is so configured that the second receiving means selectively requests the unacquired portion by designating an offset value of a head part and an offset value of a last part of the unacquired portion.

In this preferred form, the data receiving apparatus designates the offset value of the head part and the offset value of the last part of the unacquired portion of data thereby to request the data retransmitting device to send the unacquired portion, whereby the data retransmitting device can clip the corresponding data part out of the electronic file, based on the offset value of the head part and the offset value of the last part of the unacquired portion provided by the data receiving apparatus, and send it. Therefore, the data retransmitting device needs simply to hold the electronic file, so that the data retransmitting device can be constructed in a simple configuration.

In another preferred form, the data receiving apparatus of the present invention is so configured that the second receiving means requests a fixed length of aforementioned segmental data when selectively requesting the unacquired portion, that the restoring means attempts to restore the electronic file, based on the redundant data already received and the segmental data newly received by the second receiving means, and that when the restoring means fails to restore the electronic file, the second receiving means repeatedly requests the fixed length of segmental data until the restoring means succeeds in restoring the electronic file.

In another preferred form, the data receiving method of the present invention is so configured that the second receiving step comprises requesting transmission of a fixed length of aforementioned segmental data on the occasion of sending the request for transmission of the unacquired portion of the electronic file, attempting to restore the electronic file, based on the redundant data already received and the segmental data newly received, and, with a failure in restoration of the electronic file, repeatedly requesting the fixed length of segmental data until the electronic file is successfully restored.

These preferred forms utilize the redundant data already received through the unidirectional channel, on the occasion of receiving data through the bidirectional channel, whereby it becomes feasible to reduce the volume of data transmitted and received through the bidirectional channel.

In another preferred form, the data receiving apparatus of the present invention is so configured that the first receiving means receives the segmental data or the redundant data by FLUTE (File Delivery over Unidirectional Transport) and that the location information acquiring means acquires the location information included in a File Delivery Table.

In this preferred form, as long as the data receiving apparatus can receive only the File Delivery Table transmitted by FLUTE, it can acquire the electronic file through the bidirectional channel even in cases where it fails to receive the segmental data forming the electronic file or the redundant data for restoration of the segmental data.

In another preferred form, the data receiving apparatus of the present invention is so configured that the second receiving means requests the transmission of all or part of the electronic file by HTTP (Hypertext Transport Protocol) and designates a portion requested to transmit, using a Range header of HTTP.

This preferred form permits a general-purpose device such as an ordinary HTTP server to be used as a data retransmitting device. As a result, the data retransmitting device can be constructed in a simple configuration.

As described above, the present invention enables the data delivery with high reliability, without any complication of the configuration of the data transmitting apparatus, even in cases where the data receiving apparatus is incapable of simultaneously establishing the downlink channel and the uplink channel.

BRIEF DESCRIPTION OF THE DRAWINGS

The present invention may be more readily described with reference to the accompanying drawings, in which:

FIG. 3 is an illustration showing a description example of an FDT;

FIG. 4 is a flowchart showing the operation of the data receiving apparatus according to the first embodiment;

FIG. 6 is an illustration showing a description example of an FDT;

FIG. 8 is an illustration showing a description example of a Range header of HTTP;

FIG. 15 is an illustration showing a description example of an FDT in FLUTE.

DESCRIPTION OF THE PREFERRED EMBODIMENTS

The data receiving apparatus according to the first embodiment of the present invention will be described.

Figure 1:
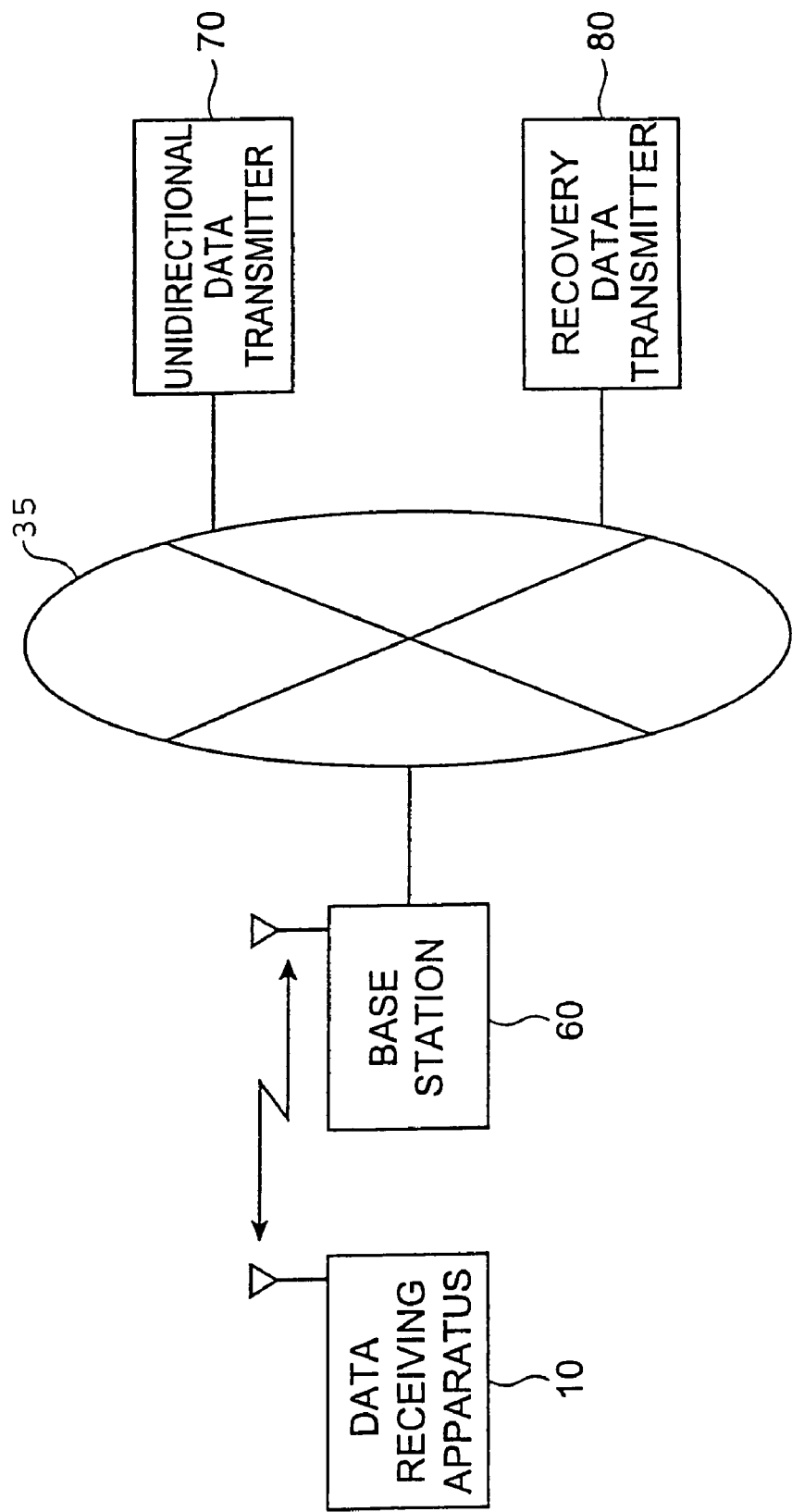
FIG. 1 is a configuration diagram of a network system incorporating a data receiving apparatus according to the first embodiment.

First, a configuration of a network system incorporating the data receiving apparatus of the present invention will be described. FIG. 1 is a configuration diagram of the network system incorporating the data receiving apparatus of the present invention. The data receiving apparatus 10 of the present invention is connected through base station 60 and network 35 to a unidirectional data transmitter 70 and to a recovery data transmitter 80. Here the unidirectional data transmitter 70 has a function of performing file delivery through a unidirectional channel to the data receiving apparatus 10 by FLUTE (File Delivery over Unidirectional Transport). The recovery data transmitter 80 has a function of performing file delivery through a bidirectional channel to the data receiving apparatus 10 by HTTP (HyperText Transfer Protocol).

FLUTE is used herein as a file delivery protocol using a unidirectional channel, but it may be any other protocol as long as it is a file delivery protocol using a unidirectional channel. Similarly, HTTP is used herein as a file delivery protocol using a bidirectional channel, but it may also be any other protocol as long as it is a file delivery protocol using a bidirectional channel.

The system herein incorporates the data receiving apparatus 10, base station 60, unidirectional data transmitter 70, and recovery data transmitter 80 only one each, but the system may incorporate two or more each of these. In the system herein, the data receiving apparatus 10 is connected through base station 60 to the unidirectional data transmitter 70 and to the recovery data transmitter 80, but the data receiving apparatus 10 may be connected through a wire circuit to the unidirectional data transmitter 70 and to the recovery data transmitter 80.

Figure 2:
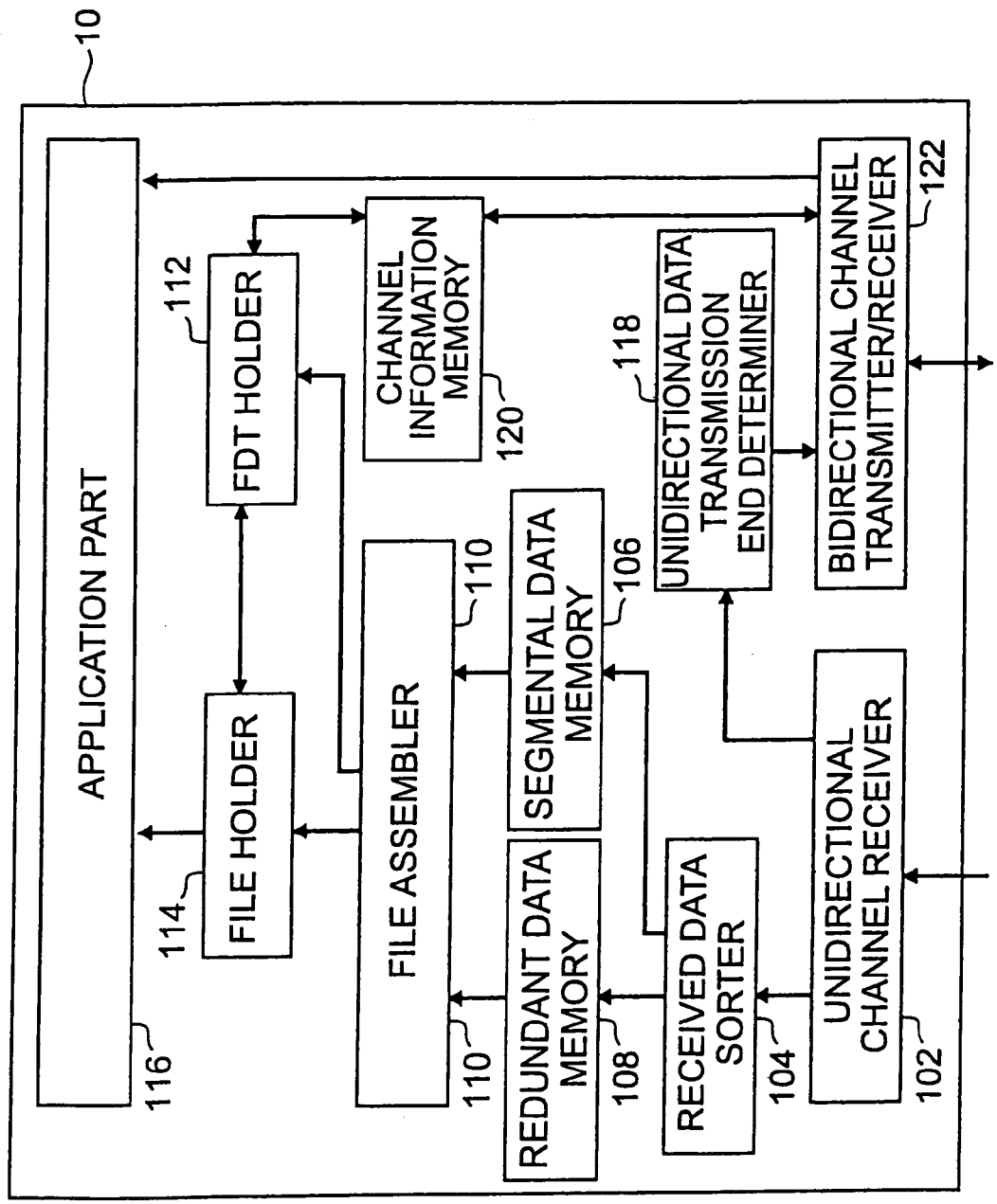
FIG. 2 is a configuration diagram of the data receiving apparatus according to the first embodiment.

Subsequently, a configuration of the data receiving apparatus 10 according to the present embodiment will be described. FIG. 2 is a configuration diagram of the data receiving apparatus 10 according to the present embodiment. The data receiving apparatus 10 of the present embodiment is comprised of a unidirectional channel receiver 102 (first receiving means), a received data sorter 104, a segmental data memory 106, a redundant data memory 108, a file assembler 110 (restoring means), an FDT holder 112, a file holder 114, an application part 116, a unidirectional data transmission end determiner 118 (determining means), a channel information memory 120 (location information acquiring means and wait time information acquiring means), and a bidirectional channel transmitter/receiver 122 (channel establishing means and second receiving means).

The unidirectional channel receiver 102 receives an FDT (File Delivery Table) and an electronic file transmitted by FLUTE from the unidirectional data transmitter 70, through a unidirectional channel. Here each of the FDT and the electronic file contains one or more segmental data forming the FDT or the electronic file, and redundant data for restoration of lost segmental data.

FIG. 3 is an illustration showing a description example of an FDT received by the unidirectional channel receiver 102. The FDT is a table describing attributes of an electronic file to be delivered. In the example shown in FIG. 3, the FDT contains such description about an electronic file with object ID(TOI)=1 that the file type is "text/html" (HTML format text) and its URL is "www.example.com/menu/tracklist.html." The FDT further contains the description of location information (dashed, enclosed part P3, "http://repair-server/menu/tracklist.html" herein) to specify a location of the electronic file necessary for a request for the electronic file upon a need for retransmission of the electronic file, and wait time information (dashed, enclosed part P4, "30s" herein) to specify a wait time before establishment of a bidirectional channel.

The received data sorter 104 sorts data received by the unidirectional channel receiver 102, into segmental data and redundant data.

The segmental data memory 106 acquires segmental data sorted out by the received data sorter 104, and temporarily stores it.

The redundant data memory 108 acquires redundant data sorted out by the received data sorter 104, and temporarily stores it.

The file assembler 110 restores the FDT and the electronic file based on the segmental data temporarily stored in the segmental data memory 106 and the redundant data temporarily stored in the redundant data memory 108. More specifically, the file assembler 110 assembles the segmental data temporarily stored in the segmental data memory 106, to restore the FDT and the electronic file. In the case of part of the segmental data being lost or the like, the file assembler 110 attempts to recover the lost segmental data by FEC decoding, using the redundant data temporarily stored in the redundant data memory 108, and utilizes the recovered segmental data for restoration of the FDT and the electronic file.

The FDT holder 112 holds (or stores) the FDT restored by the file assembler 110.

The file holder 114 holds (or stores) the electronic file restored by the file assembler 110.

The application part 116 is an application program to operate using an electronic file held by the file holder 114 or an electronic file outputted from the bidirectional channel transmitter/receiver 122.

The unidirectional data transmission end determiner 118 determines an end of transmission of segmental data forming an electronic file and redundant data for restoration of the segmental data. More specifically, the unidirectional data transmission end determiner 118 monitors the A field or B field of the LCT header of segmental data and redundant data received by the unidirectional channel receiver 102, thereby to determine an end of transmission of an electronic file. Namely, the unidirectional data transmission end determiner 118 determines that transmission of an electronic file ends or an end of transmission is approaching if the A-field or B-field of the LCT header is "1."

The channel information memory 120 acquires the location information to specify a location of an electronic file that is necessary when retransmission of the electronic file is required, and the wait time information to specify a wait time before establishment of a bidirectional channel. More specifically, the channel information memory 120 reads out the location information and the wait time information contained in the FDT held by the FDT holder 112.

The bidirectional channel transmitter/receiver 122 establishes a bidirectional channel when retransmission of an electronic file is required. More specifically, the bidirectional channel transmitter/receiver 122 establishes a bidirectional channel when the unidirectional data transmission end determiner 118 determines an end of transmission and when the file assembler 110 fails to restore an electronic file. In this case, the bidirectional channel transmitter/receiver 122 waits for a time calculated using a wait time specified by the wait time information acquired by the channel information memory 120, and a random number (e.g., a time obtained by multiplying the wait time by the random number), and thereafter establishes a bidirectional channel.

Using the bidirectional channel established as described above, the bidirectional channel transmitter/receiver 122 requests a data transmitting device specified by the location information acquired by the channel information memory 120 (in this case, the recovery data transmitter 80) to transmit the electronic file, and receives the electronic file from the recovery data transmitter 80. In this case, the bidirectional channel transmitter/receiver 122 requests the transmission of the electronic file by HTTP (Hypertext Transport Protocol) and also receives the electronic file by HTTP. The bidirectional channel transmitter/receiver 122 outputs the received electronic file to the application part 116.

Figure 5:
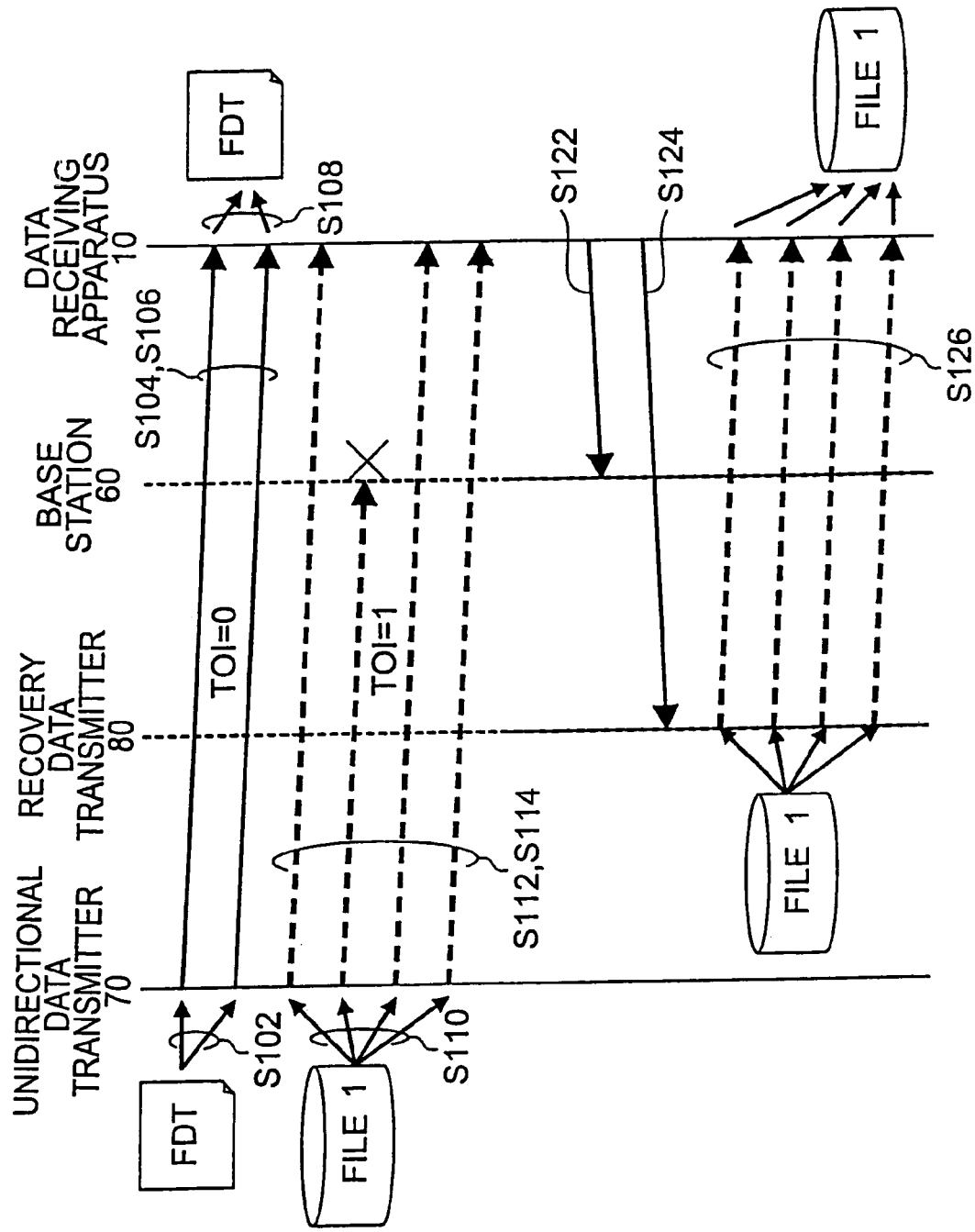
FIG. 5 is an illustration showing a delivery sequence of an electronic file to the data receiving apparatus according to the first embodiment.

Subsequently, the operation of the data receiving apparatus according to the present embodiment will be described. FIG. 4 is a flowchart showing the operation of the data receiving apparatus 10 according to the present embodiment, and FIG. 5 an illustration showing a delivery sequence of an electronic file to the data receiving apparatus 10 according to the present embodiment.

For delivery of an electronic file from the unidirectional data transmitter 70 to the data receiving apparatus 10, the unidirectional data transmitter 70 first divides an FDT into a plurality of segmental data and generates redundant data (S102). Object ID(TOI)=0 is attached to the segmental data and the redundant data (the object ID is described into the header) and the data is transmitted to the data receiving apparatus 10 (S104).

The unidirectional channel receiver 102 receives the segmental data and redundant data transmitted from the unidirectional data transmitter 70, through the unidirectional channel (S106). The data sorter 104 sorts the segmental data and the redundant data received by the unidirectional channel receiver 102, and the segmental data memory 106 and the redundant data memory 108 temporarily store the respective data. Thereafter, the file assembler 110 assembles the segmental data temporarily stored in the segmental data memory 106, to restore the FDT (S108). In a case where part of the segmental data is lost or the like, the file assembler 110 uses the redundant data temporarily stored in the redundant data memory 108 according to need, to attempt to recover the lost segmental data (FEC decoding), and uses the recovered segmental data for restoration of the FDT.

The FDT assembled by the file assembler 110 is held (stored) in the FDT holder 112.

Subsequently, the unidirectional data transmitter 70 divides an electronic file into a plurality of segmental data and generates redundant data (S110). Object ID(TOI)=1 is attached to the segmental data and the redundant data and the data is transmitted to the data receiving apparatus 10 (S112).

The unidirectional channel receiver 102 receives the segmental data and redundant data transmitted from the unidirectional data transmitter 70, through the unidirectional channel (S114). The data sorter 104 sorts the segmental data and redundant data received by the unidirectional channel receiver 102, and the segmental data memory 106 and the redundant data memory 108 temporarily store the respective data. Thereafter, the file assembler 110 assembles the segmental data temporarily stored in the segmental data memory 106, to restore the electronic file (S116). The electronic file thus restored by the file assembler 110 is held in the file holder 114, and is outputted to the application part 116 (S118), to be utilized in the application part 116.

On the other hand, if the unidirectional data transmission end determiner 118 determines an end of transmission of the segmental data forming the electronic file and the redundant data for recovery of the segmental data, and if the electronic file cannot be assembled because of a loss of part of the segmental data, the channel information memory 120 reads the location information and the wait time information out of the FDT held in the FDT holder 112 (S120). If the A field or B field of the LCT header of the received segmental data and redundant data is "1," it is determined that the transmission of the electronic file ends or the end of transmission is approaching.

Subsequently, after waiting a time obtained by e.g., multiplying the wait time specified by the wait time information acquired by the channel information memory 120 (30 seconds in the example of the FDT shown in FIG. 3), by a random number (e.g., a uniform random number generated between 0.5 and 1.5), the bidirectional channel transmitter/receiver 122 requests the base station 60 to establish a bidirectional channel, and the bidirectional channel is established (S122).

After the bidirectional channel is established, the bidirectional channel transmitter/receiver 122 requests a data transmitting device specified by the location information ("http://repair-server/menu/tracklist.html" in the example shown in FIG. 3) described in the FDT (in this case, the recovery data transmitter 80) to transmit the electronic file by HTTP (S124).

When the recovery data transmitter 80 is requested to transmit the electronic file, the recovery data transmitter 80 transmits the electronic file and the bidirectional channel transmitter/receiver 122 of the data receiving apparatus 10 receives it (S126). The electronic file received by the bidirectional channel transmitter/receiver 122 is outputted to the application part 116 (S128), to be used in the application part 116.

Subsequently, the action and effects of the data receiving apparatus according to the present embodiment will be described. In the data receiving apparatus 10 of the present embodiment, the unidirectional channel receiver 102 normally receives the electronic file through the unidirectional channel, and if retransmission of the electronic file is necessary, the bidirectional channel transmitter/receiver 122 separately establishes the bidirectional channel and requests retransmission of the electronic file. Therefore, data delivery can be performed with high reliability even in cases where the data receiving apparatus 10 is incapable of simultaneously establishing a downlink channel and an uplink channel. In the data receiving apparatus 10, the channel information memory 120 acquires the location information of the electronic file described in the FDT and the bidirectional channel transmitter/receiver 122 requests the data transmitting device specified by the location information (the recovery data transmitter 80 herein) to transmit the electronic file if retransmission of the electronic file is necessary. Therefore, the destination of the request for retransmission of the electronic file can be a device different from the data transmitting device as a data delivery source (the unidirectional data transmitter 70 herein). Therefore, the data transmitting device needs to have only the data delivery function (multicast data delivery), and the data retransmission function (the function of retransmitting a specific data part according to a data transmission request from the data receiving apparatus) can be distributed to another device. As a result, the data transmitting device can be constructed in a simple configuration. The above makes it feasible to perform the data delivery with high reliability, without any complication of the configuration of the unidirectional data transmitter 70, even in cases where the data receiving apparatus 10 is incapable of simultaneously establishing a downlink channel and an uplink channel.

In the data receiving apparatus 10 of the present embodiment, the bidirectional channel transmitter/receiver 122 establishes the bidirectional channel only if an electronic file cannot be restored while the unidirectional data transmission end determiner 118 determines an end of transmission of segmental data and redundant data. Therefore, the frequency of establishment of the bidirectional channel is lower than that in a scheme where the bidirectional channel is established every loss of segmental data or redundant data. As a result, it enables effective utilization of the network resources and radio resources.

In the data receiving apparatus 10 of the present embodiment, if an electronic file cannot be restored while the unidirectional data transmission end determiner 118 determines an end of transmission of segmental data and redundant data, the bidirectional channel transmitter/receiver 122 establishes the bidirectional channel after the time calculated using the fixed wait time and a random number. Therefore, where a plurality of data receiving devices 10 simultaneously fail to acquire an electronic file delivered through the same unidirectional channel, it is feasible to avoid these data receiving devices 10 concurrently establishing the bidirectional channel. As a result, it becomes feasible to prevent congestion of the network and radio channels and to perform stable delivery of electronic files.

Since the data receiving apparatus 10 of the present embodiment is configured to acquire the location information from the FDT transmitted by FLUTE, it can acquire the electronic file through the bidirectional channel as long as it successfully receives the FDT, even if it fails to receive the segmental data forming the electronic file or the redundant data for recovery of the segmental data.

In the data receiving apparatus 10 of the present embodiment, the bidirectional channel transmitter/receiver 122 requests transmission of an electronic file by HTTP and receives the electronic file by HTTP, and it thus becomes feasible to adopt a general-purpose device, such as an ordinary HTTP server, as the recovery data transmitter 80. As a result, the recovery data transmitter 80 can be constructed in a simple configuration.

The data receiving apparatus 10 of the first embodiment may be so configured that the channel information about the bidirectional channel is included in the FDT, the channel information memory 120 (channel information acquiring means) reads the channel information out of the FDT stored in the FDT holder 112, and the bidirectional channel transmitter/receiver 122 establishes the bidirectional channel, based on the channel information read out by the channel information memory 120.

FIG. 6 is an illustration showing a description example of an FDT in this case. As shown in FIG. 6, the FDT contains such channel information items as location information (dashed, enclosed part P5, "+81 46 840 XXXX" herein) to specify a location of an electronic file, wait time information (dashed, enclosed part P6, "1min" herein) to specify a wait time before establishment of the bidirectional channel, a bit rate of the bidirectional channel (dashed, enclosed part P7, "8000" bit/s herein), a transfer method in the bidirectional channel (dashed, enclosed part P8, "PPP" (Point-to-Point Protocol) herein), and an expiration period (dashed, enclosed part P9, "2890842807" (count value) herein) effective for a request for electronic data to the recovery data transmitter 80. In this case, the bidirectional channel transmitter/receiver 122 establishes the bidirectional channel according to these channel information items.

When the data receiving apparatus is constructed in this configuration wherein the channel information memory 120 reads the channel information about the bidirectional channel out of the FDT and wherein the bidirectional channel transmitter/receiver 122 establishes the bidirectional channel based on the channel information, the data receiving apparatus is able to simply and securely receive an electronic file from the recovery data transmitter 80. Namely, the data receiving apparatus 10 is able to simply and securely establish the bidirectional channel, using the information of the bit rate, transfer method, expiration period, etc. included in the channel information, and to receive the electronic file through the bidirectional channel. If an administrator of the network 35, the unidirectional data transmitter 70, or the recovery data transmitter 80 is allowed to designate the bit rate and the transfer method included in the channel information, it becomes feasible to avoid congestion of the network 35 or instability of the system.

The system may also be arranged so that the aforementioned channel information is preliminarily stored in an unrepresented channel information storage (channel information storing means) and the bidirectional channel transmitter/receiver 122 establishes the bidirectional channel based on the channel information read out of the channel information storage. This configuration obviates the need for transmission of the channel information from the unidirectional data transmitter 70 to the data receiving apparatus 10 on a case-by-case basis, and it is feasible to reduce the volume of information transmitted from the unidirectional data transmitter 70 to the data receiving apparatus 10. As a result, it is feasible to effectively utilize the network resources and radio resources. This scheme is effective, particularly, in carrying out continuous delivery of electronic files.

Next, a data receiving apparatus according to the second embodiment of the present invention will be described. The data receiving apparatus of the present embodiment is different from the data receiving apparatus 10 of the first embodiment described above, in that the data receiving apparatus 10 of the first embodiment receives the whole of the electronic file through the bidirectional channel, whereas the data receiving apparatus of the present embodiment receives only a lost part of the electronic file through the bidirectional channel. The data receiving apparatus of the present embodiment will be described below, without redundant description of portions similar to those in the data receiving apparatus 10 of the first embodiment.

Figure 7:
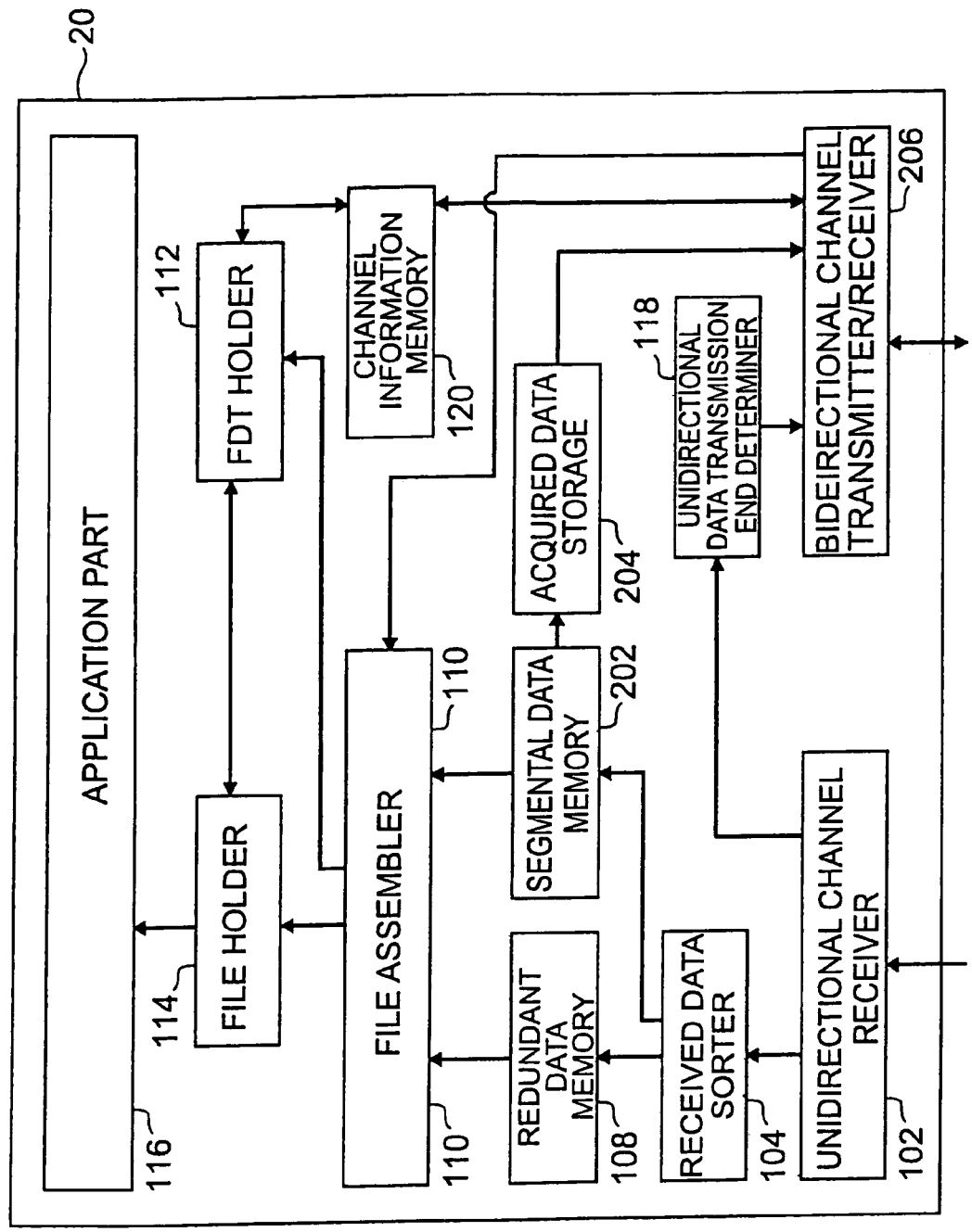
FIG. 7 is a configuration diagram of a data receiving apparatus according to the second embodiment.

First, a configuration of the data receiving apparatus according to the present embodiment will be described. FIG. 7 is a configuration diagram of the data receiving apparatus according to the present embodiment. The data receiving apparatus 20 of the present embodiment is comprised of a unidirectional channel receiver 102, a received data sorter 104, a redundant data memory 108, a file assembler 110, an FDT holder 112, a file holder 114, an application part 116, a unidirectional data transmission end determiner 118, a channel information memory 120, a segmental data memory 202, an acquired data storage 204, and a bidirectional channel transmitter/receiver 206. Here the functions of the unidirectional channel receiver 102, received data sorter 104, redundant data memory 108, file assembler 110, FDT holder 112, file holder 114, application part 116, unidirectional data transmission end determiner 118, and channel information memory 120 are the same as those in the data receiving apparatus 10 of the first embodiment.

The segmental data memory 202 acquires the segmental data sorted out by the received data sorter 104, and temporarily stores it. The segmental data memory 202 outputs an offset value of the head part and an offset value of the last part of each received data to the acquired data storage 204.

The acquired data storage 204 stores the offset value of the head part and the offset value of the last part of each data received by the segmental data memory 202.

The bidirectional channel transmitter/receiver 206 establishes a bidirectional channel according to a procedure similar to that carried out by the bidirectional channel transmitter/receiver 122 of the data receiving apparatus 10 of the first embodiment. Using the bidirectional channel established as described above, the bidirectional channel transmitter/receiver 206 selectively requests a data transmitting device specified by the location information acquired by the channel information memory 120 (in this case, the recovery data transmitter 80) to transmit unacquired segmental data out of the segmental data forming the electronic file. More specifically, the bidirectional channel transmitter/receiver 206 refers to the offset values of the head part and the offset values of the last part of already acquired segmental data stored in the acquired data storage 204, to specify unacquired segmental data. Subsequently, the bidirectional channel transmitter/receiver 206 designates the offset value of the head part and the offset value of the last part of the unacquired segmental data, thereby to selectively request the recovery data transmitter 80 to transmit the unacquired segmental data.

The bidirectional channel transmitter/receiver 206 requests the transmission of the electronic file by HTTP and receives the electronic file by HTTP, and, in this case, it designates a portion requested to transmit, i.e., unacquired segmental data by use of the Range header of HTTP. FIG. 8 is an illustration showing an example of the Range header of HTTP. For example, where the unacquired segmental data is from the 101st byte to the 200th byte of the electronic file, the bidirectional channel transmitter/receiver 206 requests transmission of the unacquired segmental data by describing it into the Range header, as indicated in dashed, enclosed part P10 in FIG. 8. This shows the example of requesting only one segmental data, but it is also possible to request a plurality of segmental data at a time.

The bidirectional channel transmitter/receiver 206 outputs received segmental data to the file assembler 110. The file assembler 110 assembles the electronic file, also using the segmental data outputted from the bidirectional channel transmitter/receiver 206.

Figure 9:
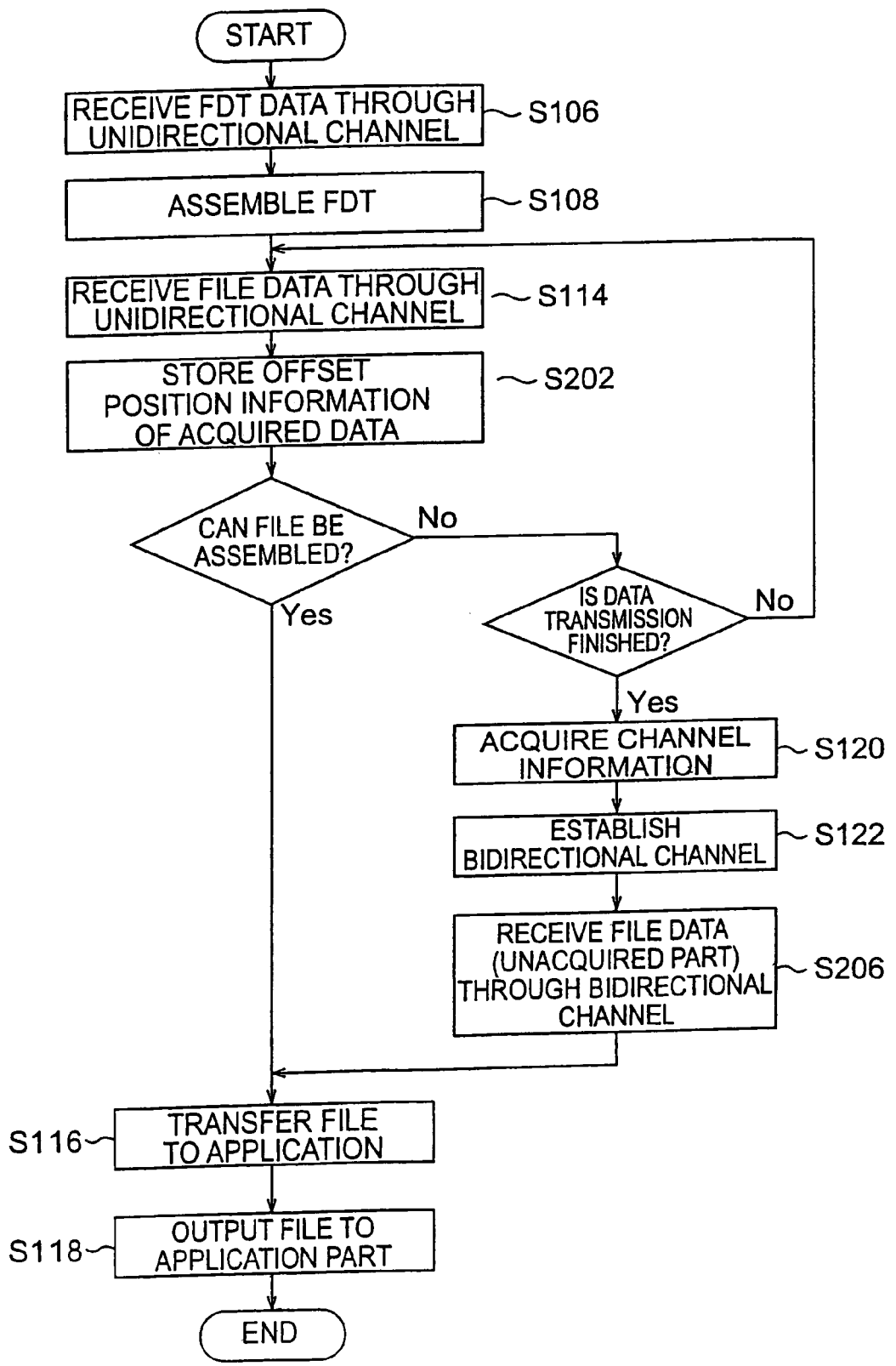
FIG. 9 is a flowchart showing the operation of the data receiving apparatus according to the second embodiment.
Figure 10:
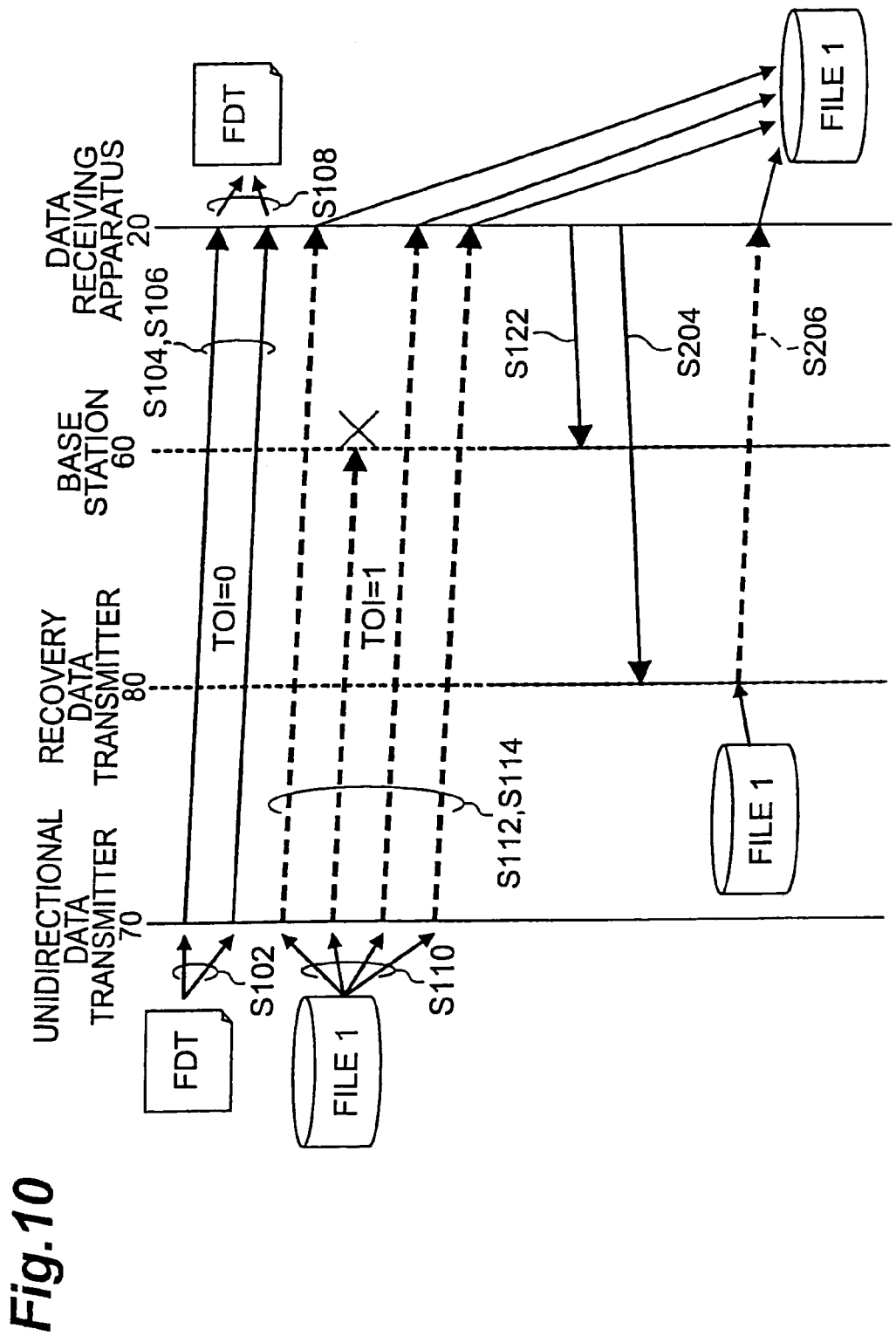
FIG. 10 is an illustration showing a delivery sequence of an electronic file to the data receiving apparatus according to the second embodiment.

Subsequently, the operation of the data receiving apparatus according to the present embodiment will be described. FIG. 9 is a flowchart showing the operation of the data receiving apparatus 20 of the present embodiment, and FIG. 10 an illustration showing a delivery sequence of an electronic file to the data receiving apparatus 20 according to the present embodiment.

The transmission of the FDT and the electronic file from the unidirectional data transmitter 70 to the data receiving apparatus 20 is similar to the procedure of S102-S114 described in the first embodiment.

The data sorter 104 sorts the data received by the unidirectional channel receiver 102, into the segmental data and the redundant data, and the segmental data memory 202 and the redundant data memory 108 temporarily store the respective data. On that occasion, the segmental data memory 202 outputs the offset value of the head part and the offset value of the last part of each segmental data acquired by the segmental data memory 202 and they are stored into the acquired data storage 204 (S202).

The restoration of the electronic file and the output to the application part 116 thereafter are similar to the procedure of S116-S118 described in the first embodiment.

If the electronic file cannot be assembled because of a loss of part of the segmental data while the unidirectional data transmission end determiner 118 determines an end of transmission of the segmental data forming the electronic file and the redundant data for restoration of the segmental data, the channel information memory 120 reads the location information and the wait time information (S120) and a bidirectional channel is established after passage of a time obtained by multiplying the wait time specified by the wait time information, by a random number (S122).

After the bidirectional channel is established, the bidirectional channel transmitter/receiver 206 selectively requests a data transmitting device specified by the location information acquired by the channel information memory 120 (in this case, the recovery data transmitter 80) to transmit the unacquired segmental data out of the segmental data forming the electronic file, through the bidirectional channel established as described above (S206). More specifically, the bidirectional channel transmitter/receiver 206 refers to the offset values of the head part and the offset values of the last part of already acquired segmental data stored in the acquired data storage 204, to specify the unacquired segmental data. Subsequently, the bidirectional channel transmitter/receiver 206 designates the offset value of the head part and the offset value of the last part of the unacquired segmental data, thereby to selectively request the recovery data transmitter 80 to transmit the unacquired segmental data.

The segmental data received by the bidirectional channel transmitter/receiver 206 is outputted to the file assembler 110. Thereafter, the file assembler 110 assembles the electronic file, using the segmental data already received through the unidirectional channel and the segmental data newly received through the bidirectional channel.

Subsequently, the action and effects of the data receiving apparatus according to the present embodiment will be described. The data receiving apparatus 20 of the present embodiment has the effects as described below, in addition to the effects of the data receiving apparatus 10 of the first embodiment. Specifically, in the data receiving apparatus 20 of the present embodiment the bidirectional channel transmitter/receiver 206 selectively requests the recovery data transmitter 80 to transmit the unacquired segmental data. Therefore, there is no need for retransmission of segmental data already acquired through the unidirectional channel, through the bidirectional channel. Accordingly, it is feasible to reduce the volume of information transmitted from the recovery data transmitter 80 to the data receiving apparatus 20. As a result, it is feasible to effectively utilize the network resources and radio resources.

In the data receiving apparatus 20 of the present embodiment, particularly, the bidirectional channel transmitter/receiver designates the offset value of the head part and the offset value of the last part of the unacquired segmental data, thereby to request the recovery data transmitter 80 to transmit the unacquired segmental data. Therefore, the recovery data transmitter 80 can clip the corresponding data part from the electronic file based on the offset value of the head part and the offset value of the last part of the unacquired segmental data provided by the data receiving apparatus 20, and transmit it. As a result, the recovery data transmitter 80 needs merely to hold the electronic file, whereby the recovery data transmitter 80 can be constructed in a simple configuration.

Subsequently, a data receiving apparatus according to the third embodiment of the present invention will be described. The data receiving apparatus of the present embodiment is different from the data receiving apparatus 20 of the second embodiment described above, in that the data receiving apparatus 20 of the second embodiment receives all the lost portion of the electronic file, whereas the data receiving apparatus of the present embodiment is configured to receive a part of a lost portion of an electronic file and attempt to assemble the electronic file, and to repeatedly carry out this process until it successfully assembles the electronic file. The data receiving apparatus of the present embodiment will be described below, without redundant description of portions similar to those in the data receiving apparatus 20 of the second embodiment.

Figure 11:
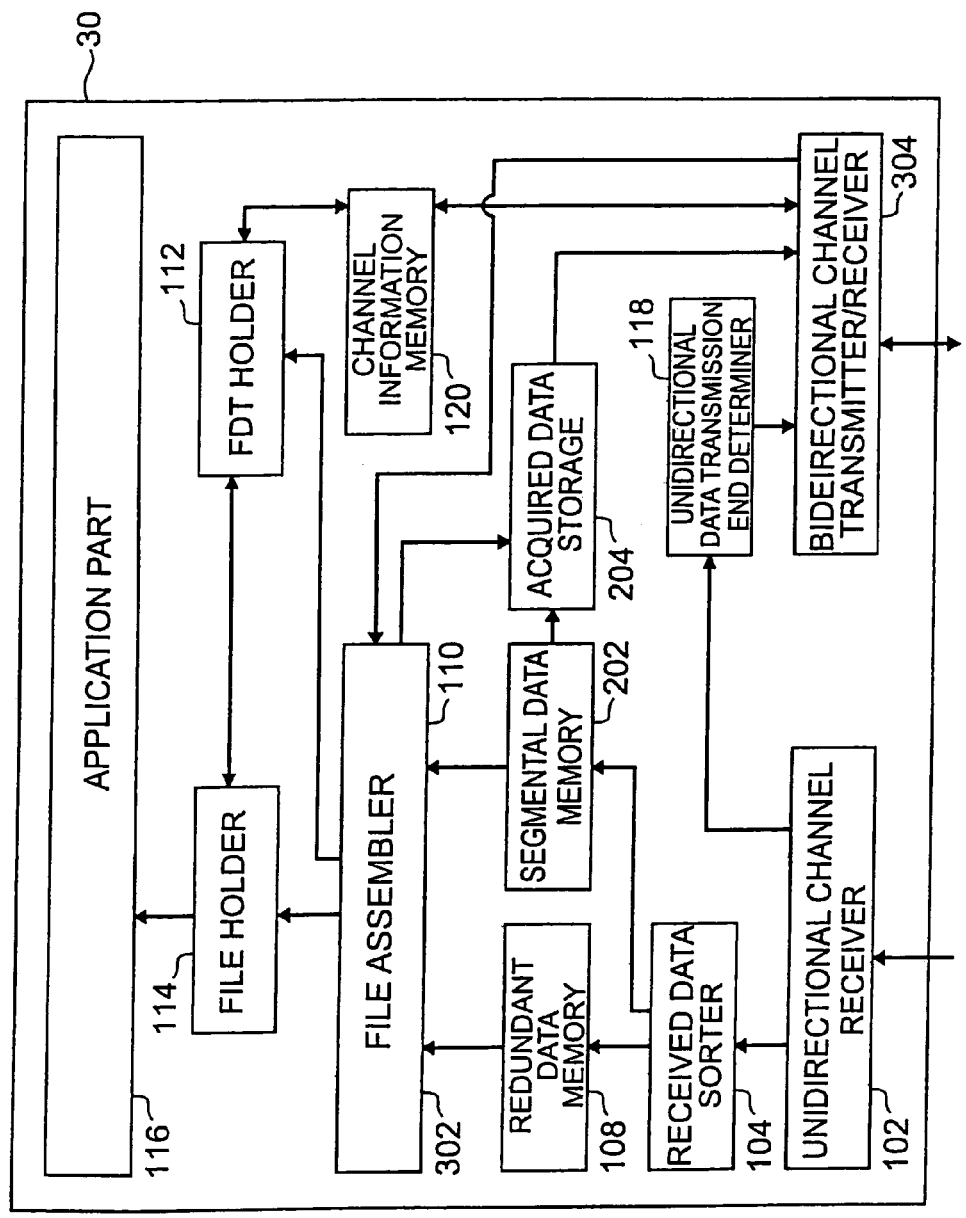
FIG. 11 is a configuration diagram of a data receiving apparatus according to the third embodiment.

First, a configuration of the data receiving apparatus according to the present embodiment will be described. FIG. 11 is a configuration diagram of the data receiving apparatus 30 according to the present embodiment. The data receiving apparatus 30 of the present embodiment is comprised of a unidirectional channel receiver 102, a received data sorter 104, a redundant data memory 108, an FDT holder 112, a file holder 114, an application part 116, a unidirectional data transmission end determiner 118, a channel information memory 120, a segmental data memory 202, an acquired data storage 204, a file assembler 302, and a bidirectional channel transmitter/receiver 304. Here the functions of the unidirectional channel receiver 102, received data sorter 104, redundant data memory 108, FDT holder 112, file holder 114, application part 116, unidirectional data transmission end determiner 118, channel information memory 120, segmental data memory 202, and acquired data storage 204 are the same as those in the data receiving apparatus 20 of the second embodiment.

The file assembler 302 restores the FDT and the electronic file based on the segmental data temporarily stored in the segmental data memory 202 and the redundant data temporarily stored in the redundant data memory 108. More specifically, the file assembler 302 assembles the segmental data temporarily stored in the segmental data memory 202 to restore the FDT and the electronic file. In a case where a part of the segmental data is lost or the like, the file assembler 302 attempts to recover the lost segmental data by FEC decoding, using the redundant data temporarily stored in the redundant data memory 108, and uses the recovered segmental data for restoration of the FDT and the electronic file.

In a case where the electronic file cannot be restored because of a loss of a part of the segmental data, the file assembler 302 attempts to restore the electronic file, also using the segmental data received by the bidirectional channel transmitter/receiver 304 (the details of which will be described later). In this case, the file assembler 302 also attempts to recover the lost segmental data, using the redundant data temporarily stored in the redundant data memory 108, and uses the recovered segmental data for restoration of the electronic file. The file assembler 302 also outputs the offset value of the head part and the offset value of the last part of the segmental data successfully recovered using the segmental data received by the bidirectional channel transmitter/receiver 304, and the already acquired redundant data, to the acquired data storage 204.

The acquired data storage 204 stores the offset values outputted from the file assembler 302, as the offset value of the head part and the offset value of the last part of already acquired data.

The bidirectional channel transmitter/receiver 304 establishes the bidirectional channel according to the procedure similar to that carried out by the bidirectional channel transmitter/receiver 122 of the data receiving apparatus 10 of the first embodiment. Using the bidirectional channel established as described above, the bidirectional channel transmitter/receiver 304 also selectively requests a data transmitting device specified by the location information acquired by the channel information memory 120 (in this case, the recovery data transmitter 80) to transmit one (a fixed length of segmental data) out of the unacquired segmental data in the segmental data forming the electronic file. More specifically, the bidirectional channel transmitter/receiver 304 refers to the offset values of the head part and the offset values of the last part of already acquired segmental data stored in the acquired data storage 204, to specify the unacquired segmental data. Subsequently, the bidirectional channel transmitter/receiver 304 designates the offset value of the head part and the offset value of the last part of one (e.g., one having the smallest offset value of the head part) out of the unacquired segmental data, and selectively requests the recovery data transmitter 80 to transmit the one of the unacquired segmental data. The bidirectional channel transmitter/receiver 304 also outputs received segmental data to the file assembler 302.

If the file assembler 302 fails to restore the electronic file even with use of the newly received segmental data, the bidirectional channel transmitter/receiver 304 repeatedly requests the recovery data transmitter 80 to transmit new one of the unacquired segmental data at each time until the file assembler 302 successfully restores the electronic file.

Figure 12:
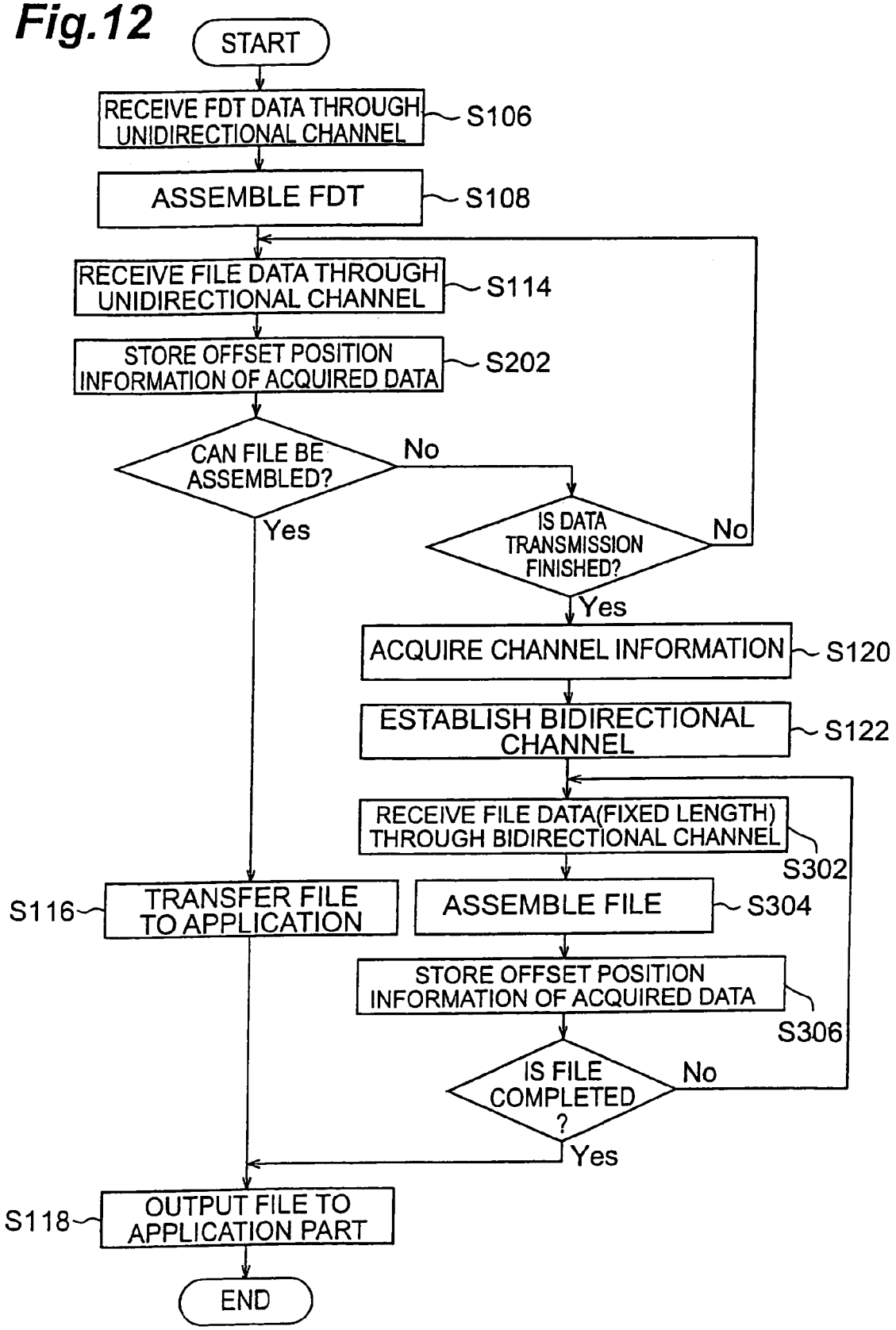
FIG. 12 is a flowchart showing the operation of the data receiving apparatus according to the third embodiment.

Subsequently, the operation of the data receiving apparatus of the present embodiment will be described. FIG. 12 is a flowchart showing the operation of the data receiving apparatus 30 of the present embodiment.

The transmission of the FDT and the electronic file from the unidirectional data transmitter 70 to the data receiving apparatus 30, the storage of the offset value of the head part and the offset value of the last part of each acquired segmental data, the restoration of the electronic file, and the output to the application part 116 are the same as the procedure of S106-S118 and S202 described in the second embodiment.

If the electronic file cannot be assembled because of a loss of a part of the segmental data while the unidirectional data transmission end determiner 118 determines an end of transmission of the segmental data forming the electronic file and the redundant data for restoration of the segmental data, the channel information memory 120 reads the location information and the wait time information (S120) and a bidirectional channel is established after a time obtained by multiplying the wait time specified by the wait time information, by a random number (S122).

After the bidirectional channel is established, the bidirectional channel transmitter/receiver 304 selectively requests a data transmitting device specified by the location information acquired by the channel information memory 120 (in this case, the recovery data transmitter 80), through the bidirectional channel established as described above, to transmit one of the unacquired segmental data out of the segmental data forming the electronic file (S302). More specifically, the bidirectional channel transmitter/receiver 304 refers to the offset values of the head part and the offset values of the last part of already acquired segmental data stored in the acquired data storage 204, to specify the unacquired segmental data. Subsequently, the bidirectional channel transmitter/receiver 304 designates the offset value of the head part and the offset value of the last part of one of the unacquired segmental data (e.g., one having the smallest offset value of the head part), thereby to selectively request the recovery data transmitter 80 to transmit the unacquired segmental data.

The segmental data received by the bidirectional channel transmitter/receiver 304 is outputted to the file assembler 302. Thereafter, the file assembler 302 assembles the electronic file, using the segmental data already received through the unidirectional channel and the segmental data newly received through the bidirectional channel (S304). On that occasion, the file assembler attempts to recover the lost segmental data, using the redundant data already acquired. The segmental data successfully recovered using the segmental data received by the bidirectional channel transmitter/receiver 304 and the redundant data already acquired is regarded as already acquired segmental data and the offset value of the head part and the offset value of the last part thereof are stored into the acquired data storage 204 (S306).

When the file assembler 302 successfully restores the electronic file herein, the restored electronic file is outputted to the application part 116 to be used therein (S118). On the other hand, if the file assembler 302 fails to restore the electronic file, the bidirectional channel transmitter/receiver 304 repeatedly requests the recovery data transmitter 80 to transmit new one of the unacquired segmental data until the file assembler 302 succeeds in restoration of the electronic file.

Figure 13:
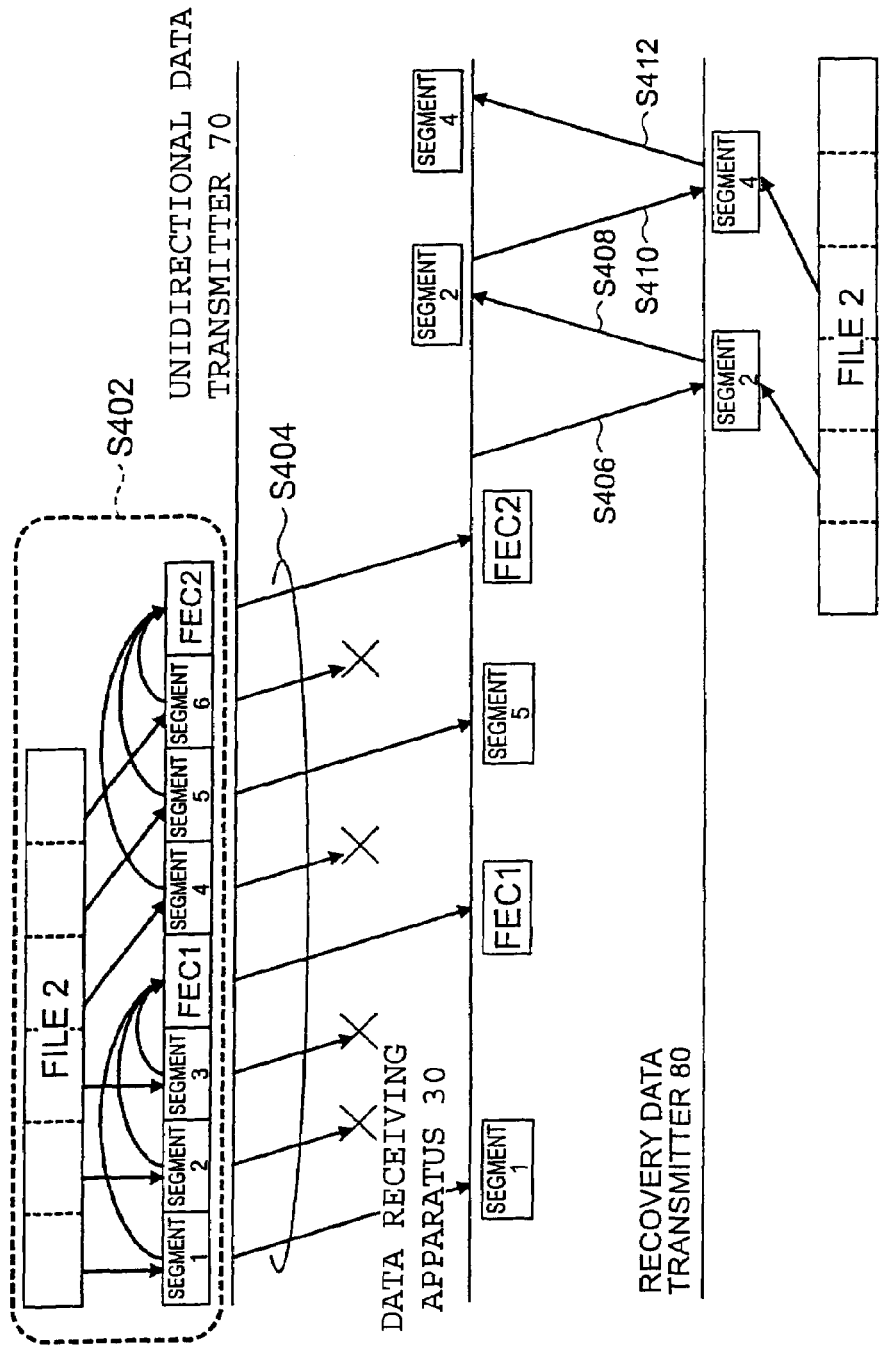
FIG. 13 is an illustration showing a delivery sequence of an electronic file to the data receiving apparatus according to the third embodiment.
Figure 14:
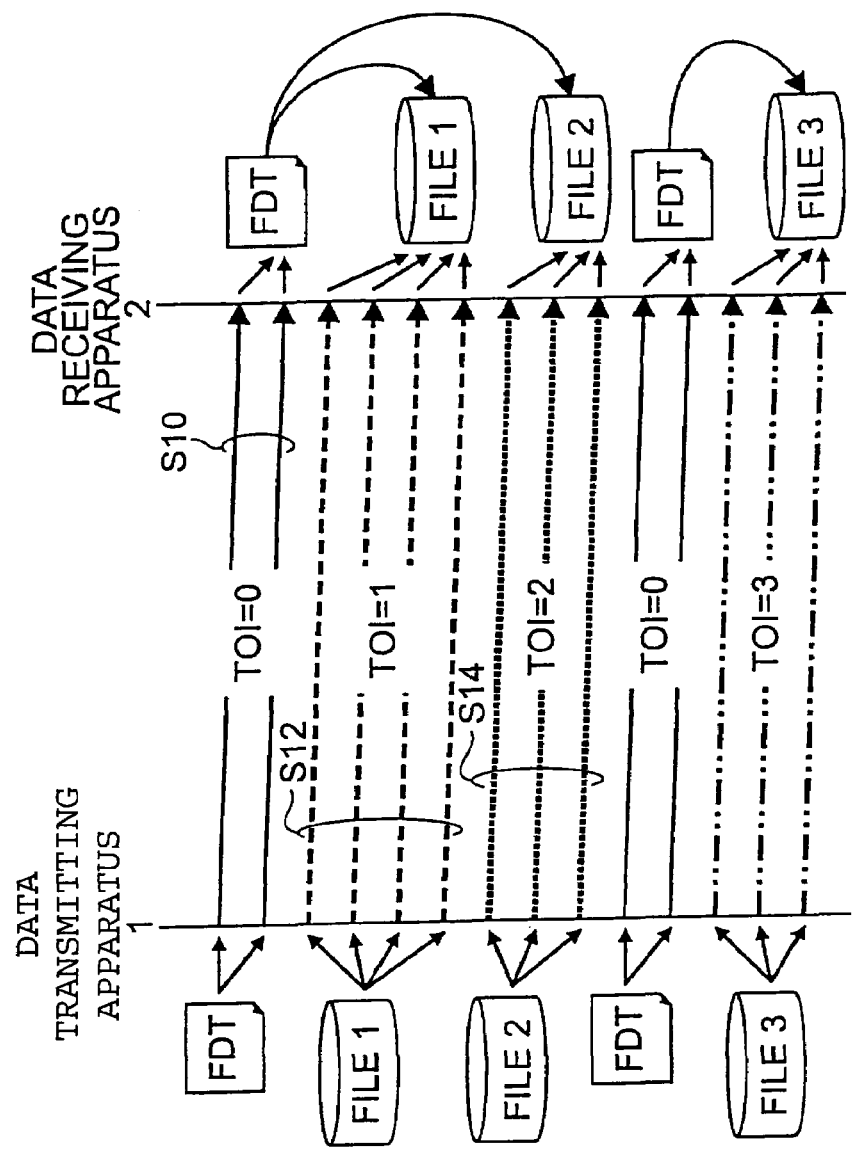
FIG. 14 is an illustration showing a file delivery sequence in FLUTE.

The procedure of reception of the electronic file by the data receiving apparatus 30 of the present embodiment will be described below in more detail. FIG. 13 is an illustration showing a delivery sequence of an electronic file to the data receiving apparatus 30 in the present embodiment. It is supposed herein that the data receiving apparatus 30 has already received the FDT.

First, the unidirectional data transmitter 70 divides an electronic file 2 into data segments 1 to 6, generates redundant data (FEC) 1 based on the data segments 1 to 3, and also generates redundant data (FEC) 2 based on the data segments 4 to 6 (S402). Here the redundant data is information for recovery of lost segmental data. Namely, based on any two data segments out of the data segments 1 to 3, and the redundant data 1, it becomes feasible to restore the other data segment. Likewise, based on any two data segments out of the data segments 4 to 6, and the redundant data 2, it becomes feasible to restore the other data segment. Such redundant data is generated by use of some FEC codes such as XOR codes or Reed-Solomon Codes. The data length of each of the data segments and the redundant data is supposed to be 100 bytes (the data segments and the redundant data having the same data length) herein for convenience' sake, but the data length is not limited to this.

Subsequently, the unidirectional data transmitter 70 successively transmits the data segments 1-3, redundant data 1, data segments 4-6, and redundant data 2 to the data receiving apparatus 30 (S404).

It is supposed herein that the data segments 2, 3, 4, and 6 were lost and the data receiving apparatus 30 failed to receive them. It is also supposed that upon transmission of the redundant data 2 the unidirectional data transmitter 70 notified the data receiving apparatus 30 of an end of the data transmission about the electronic file 2.

The unidirectional channel receiver 102 of the data receiving apparatus 30 receives the data segments and the redundant data and the file assembler 302 attempts to restore the file, based on the data segments and redundant data thus received. Here the offset values of the head part and the offset values of the last part of the received data segments are stored into the acquired data storage 204.

The unidirectional data transmission end determiner 118 sequentially monitors whether the delivery of the electronic file through the unidirectional channel is finished, and it determines an end of the delivery of the electronic file through the unidirectional channel upon reception of the redundant data 2. At this point, the data received by the data receiving apparatus 30 is only the data segments 1, 5 and the redundant data 1, 2, so that the electronic file cannot be restored.

Then the bidirectional channel transmitter/receiver 304 establishes a bidirectional channel and refers to the acquired data storage 204. Thereafter, the bidirectional channel transmitter/receiver 304 requests the recovery data transmitter 80 to transmit the data part from the 101st byte to the 200th byte of the electronic file by HTTP (S406). The data part is a portion corresponding to the data segment 2 (unacquired).

The bidirectional channel transmitter/receiver 304 receives the data segment 2 transmitted in response to this request from the recovery data transmitter 80 (S408), and then the data segment 2 is outputted to the file assembler 302.

Subsequently, the file assembler 302 attempts to restore the electronic file 2 and the unacquired segmental data by combining the segmental data and redundant data already received through the unidirectional channel, with the data segment newly received through the bidirectional channel. At this point, the data segment 3 can be restored by combining the data segment 1 and redundant data 1 already received through the unidirectional channel with the data segment 2 newly received through the bidirectional channel. At this point, the data segments 2, 3 are regarded as already received segmental data and the offset values of the head part and the offset values of the last part thereof are stored into the acquired data storage 204.

However, since the data segments 4 and 6 are not acquired yet, the electronic file cannot be restored. Therefore, the bidirectional channel transmitter/receiver refers to the acquired data storage 204 and thereafter requests the recovery data transmitter 80 to send the data part from the 301st byte to the 400th byte of the electronic file by HTTP (S410). The data part is a portion corresponding to the data segment 4 (unacquired).

The bidirectional channel transmitter/receiver 304 receives the data segment 4 transmitted in response to this request from the recovery data transmitter 80 (S412), and then the data segment 4 is outputted to the file assembler 302.

Subsequently, the file assembler 302 attempts to restore the electronic file 2 and the unacquired segmental data by combining the segmental data and redundant data already received through the unidirectional channel with the data segment newly received through the bidirectional channel. Here the data segment 6 can be restored by combining the data segment 5 and redundant data 2 already received through the unidirectional channel with the data segment 4 newly received through the bidirectional channel. At this point, the data segments 4, 6 are regarded as already received segmental data and the offset values of the head part and the offset values of the last part thereof are stored into the acquired data storage 204.

At this point, the data receiving apparatus 30 successfully acquired all the data segments 1 to 6 forming the electronic file 2. The file assembler 302 restores the electronic file 2, and the electronic file 2 thus restored is outputted to the application part 116.

Subsequently, the action and effects of the data receiving apparatus of the present embodiment will be described. The data receiving apparatus 30 of the present embodiment has the effect as described below, in addition to the effects of the data receiving apparatus 20 of the second embodiment. Namely, the data receiving apparatus 30 of the present embodiment is configured to utilize the redundant data already received through the unidirectional channel, on the occasion of receiving data through the bidirectional channel, whereby it becomes feasible to reduce the volume of data transmitted and received through the bidirectional channel. In the specific example described referring to FIG. 13, while four data segments are lost, only two data segments are acquired through the bidirectional channel.

What is claimed is:

1. A data receiving apparatus comprising:
    first receiving means for receiving through a unidirectional channel, segmental data forming an electronic file, or redundant data for restoration of the segmental data from a first data transmitter;
    restoring means for restoring the electronic file, based on the segmental data or the redundant data received by the first receiving means;
    location information acquiring means for acquiring location information for specifying a second data transmitter that includes the electronic file;
    channel establishing means for establishing a bidirectional channel with the second data transmitter when there arises a need for retransmission of all or part of the electronic file;
    determining means for determining an end of transmission of the segmental data forming the electronic file, or the redundant data for restoration of the segmental data;
    wait time information acquiring means for acquiring, from a file included in the segmental data received through the unidirectional channel, wait time information for specifying a wait time before establishment of a bidirectional channel,
    wherein the channel establishing means establishes the bidirectional channel after a wait for a time calculated using the wait time specified by the wait time information acquired by the wait time information acquiring means, and a random number when the determining means determines the end of transmission and the restoring means fails to restore the electronic file; and
    second receiving means for sending a request for transmission of all or part of the electronic file to the second data transmitter through the bidirectional channel established by the channel establishing means, and for receiving all or part of the electronic file from the second data transmitter through the bidirectional channel.

2. The data receiving apparatus according to claim 1, further comprising:
    channel information acquiring means for acquiring channel information about the bidirectional channel,
    wherein the channel establishing means establishes the bidirectional channel, based on the channel information acquired by the channel information acquiring means.

3. The data receiving apparatus according to claim 1, further comprising:
    channel information storing means for preliminarily storing channel information about the bidirectional channel,
    wherein the channel establishing means establishes the bidirectional channel, based on the channel information stored in the channel information storing means.

4. The data receiving apparatus according to claim 1, wherein when sending the request for transmission of all or part of the electronic file, the second receiving means selectively requests an unacquired portion.

5. The data receiving apparatus according to claim 4, wherein the second receiving means selectively requests the unacquired portion by designating an offset value of a head part and an offset value of a last part of the unacquired portion.

6. The data receiving apparatus according to claim 4, wherein the second receiving means requests a fixed length of said segmental data when selectively requesting the unacquired portion,
    wherein the restoring means attempts to restore the electronic file, based on the redundant data already received and segmental data newly received by the second receiving means, and
    wherein when the restoring means fails to restore the electronic file, the second receiving means repeatedly requests the fixed length of segmental data until the restoring means succeeds in restoring the electronic file.

7. The data receiving apparatus according to claim 1, wherein the first receiving means receives the segmental data or the redundant data by FLUTE (File Delivery over Unidirectional Transport), and
    wherein the location information acquiring means acquires the location information included in a File Delivery Table.

8. The data receiving apparatus according to claim 1, wherein the second receiving means requests the transmission of all or part of the electronic file by HTTP (HyperText Transport Protocol) and designates a portion requested to transmit, using a Range header of HTTP.

9. A data receiving method for a data receiving apparatus to receive an electronic file, the data receiving method comprising:
    receiving through a unidirectional channel, segmental data forming the electronic file, or redundant data for restoration of the segmental data from a first data transmitter;
    restoring the electronic file, based on the segmental data or the redundant data received;
    acquiring location information for specifying a second data transmitter that includes the electronic file;
    establishing a bidirectional channel with the second data transmitter when there arises a need for retransmission of all or part of the electronic file;
    determining an end of transmission of the segmental data forming the electronic file, or the redundant data for restoration of the segmental data;
    acquiring, from a file included in the segmental data received through the unidirectional channel, wait time information for specifying a wait time before establishment of a bidirectional channel,
    wherein the bidirectional channel is established after a wait for a time calculated using the wait time specified by the wait time information acquired, and a random number when the end of transmission is determined and the restoring fails to restore the electronic file; and
    sending a request for transmission of all or part of the electronic file to the second data transmitter through the bidirectional channel established, and receiving all or part of the electronic file from the second data transmitter through the bidirectional channel.

10. The data receiving method according to claim 9, further comprising:
    selectively requesting an unacquired portion when sending the request for transmission of all or part of the electronic file.

11. The data receiving method according to claim 10, further comprising:
    requesting transmission of a fixed length of said segmental data on the occasion of sending the request for transmission of the unacquired portion of the electronic file, attempting to restore the electronic file, based on the redundant data already received and segmental data newly received, and, with a failure in restoration of the electronic file, repeatedly requesting the fixed length of segmental data until the electronic file is successfully restored.

12. A data receiving apparatus comprising:
    a first interface configured to receive through a unidirectional channel, segmental data forming an electronic file, or redundant data for restoration of the segmental data from a first data transmitter;

restoring unit configured to restore the electronic file, based on the segmental data or the redundant data received by the first receiving means;

location information acquiring unit configured to acquire location information for specifying a second data transmitter that includes the electronic file;

channel establishing unit configured to establish a bidirectional channel with the second data transmitter when there arises a need for retransmission of all or part of the electronic file;

determining unit configured to determine an end of transmission of the segmental data forming the electronic file, or the redundant data for restoration of the segmental data;

wait time information acquiring unit configured to acquire, from a file included in the segmental data received through the unidirectional channel, wait time information for specifying a wait time before establishment of a bidirectional channel, wherein the channel establishing unit establishes the bidirectional channel after a wait for a time calculated using the wait time specified by the wait time information acquired by the wait time information acquiring unit, and a random number when the determining unit determines the end of transmission and the restoring unit fails to restore the electronic file; and an interface configured to send a request for transmission of all or part of the electronic file to the second data transmitter through the bidirectional channel established by the channel establishing units, and to receive all or part of the electronic file from the second data transmitter through the bidirectional channel.

* * * * *